United States Patent [19]

Miyauchi et al.

[11] Patent Number: 5,084,857
[45] Date of Patent: Jan. 28, 1992

[54] INFORMATION RECORDING METHOD USING A MODULATED RECORDING BEAM AT HIGH, INTERMEDIATE AND LOW POWER LEVELS

[75] Inventors: Yasushi Miyauchi, Hachioji; Motoyasu Terao, Tokyo; Hiroshi Yasuoka, Fujisawa; Tetsuya Nishida, Hachioji; Keikichi Andoo, Musashino, all of Japan

[73] Assignee: Hitachi, Ltd., Tokyo, Japan

[21] Appl. No.: 359,803

[22] Filed: May 31, 1989

[30] Foreign Application Priority Data

Jun. 8, 1988 [JP] Japan .................................. 63-139392
Jun. 15, 1988 [JP] Japan .................................. 63-145788

[51] Int. Cl.$^5$ ............................................. G11B 7/125
[52] U.S. Cl. .................................. 369/116; 369/44.37; 369/44.33; 369/121
[58] Field of Search ................... 369/116, 44.33, 44.37, 369/121; 346/135.1

[56] References Cited

U.S. PATENT DOCUMENTS

4,710,911 12/1987 Yamada et al. ...................... 369/116

Primary Examiner—Envall, Jr. Roy N.
Assistant Examiner—Nabil Hindi
Attorney, Agent, or Firm—Pennie & Edmonds

[57] ABSTRACT

The present invention relates to a method of recording on a rewritable recording medium using a laser beam capable of producing at least three discreet levels of power. The three levels of power used for writing to the recording medium is greater than the power required for reading. The present method is unique in that the power level of the laser beam is modulated between high, intermediate, and low levels over a time period so that at least three discreet power levels are radiated to the recording medium during recording. The increment of the radiation energy of the upward pulse from the intermediate level toward the high level is within the range of 0.8 to 1.2 times the decrement of the radiation energy of the downward pulse from the intermediate level to the low level. The present invention provides high density recording capability with minimum non-erasure areas even when the recording medium is formed from a high velocity crystallization (high speed erasure).

9 Claims, 8 Drawing Sheets

(a) PULSE WIDTH FOR LOW POWER LEVEL
(b) TIME FOR INTERMEDIATE LEVEL
(c) PULSE WIDTH FOR HIGH POWER LEVEL

(a) PULSE WIDTH FOR LOW POWER LEVEL
(c) PULSE WIDTH FOR HIGH POWER LEVEL

(a) PULSE WIDTH FOR LOW POWER LEVEL
(b) TIME FOR INTERMEDIATE LEVEL
(c) PULSE WIDTH FOR HIGH POWER LEVEL

INFORMATION RECORDING METHOD USING A MODULATED RECORDING BEAM AT HIGH, INTERMEDIATE AND LOW POWER LEVELS

BACKGROUND OF THE INVENTION

This invention relates to an information recording method of recording information by use of an information recording medium capable of recording information by the radiation of an energy beam, and more particularly to an information recording method suitable for overwrite for recording new information while erasing existing information in accordance with an arbitrary modulation method by use of a recording film capable of high velocity crystallization.

A method of recording information which contracts a luminous flux such as a laser beam to a fine beam spot, records and reproduces signals in a high density on a rewritable optical recording medium and records new information while erasing the existing information that has once been recorded is disclosed, for example, in Japanese Patent Laid-Open No. 259229/1987. If a recording film capable of high velocity erasure is used as described in the above-identified reference, it makes possible to effect crystallization in substantially the same time as the radiation time of the laser spot for recording by rendering the recording medium amorphous. The two levels of power, a high power level and an intermediate level, are used to write, both levels being higher than the power level required for reading. This method provides the advantage in that new information can be recorded while existing information is being erased (overwrite).

When recording and erasure are made onto a phase change type optical recording film by the conventional technique described above, the recording film has the composition satisfying the relation $$\alpha < \tau < \beta \tag{1}$$

where $\tau$ is the time necessary for the recording film to exhibit the phase change, from the amorphous state to the crystalline state; or from one of the crystalline states to the other; or a crystallization time; or a phase change time. $\alpha$ is the time in which the temperature of the recording medium passes through the crystallization or the phase change temperature zone at the fall portion of a given laser beam pulse from the high power level. Finally $\beta$ is the time in which the temperature of the recording medium passes through the crystallization or phase change temperature zone after the passage of the optical spot at the continuous portion of the high power level of the given laser beam pulse. When the recording film satisfying the relation (1) above is used, a reproduction waveform can be obtained whose voltage changes drastically only near the rise portion of the recording pulse from the intermediate power level to the high power level and near the fall portion from the high power level to the intermediate power level. At this time, the crystalline area occupies the major proportion at the rise portion while the amorphous area occupies the major proportion at the fall portion. Furthermore, the crystalline area and the amorphous area are copresent (intermediate state in the portion to which the beam of the intermediate power level is radiated and in the portion between the rise portion and the fall portion to which the beam of the high power level is radiated continuously).

SUMMARY OF THE INVENTION

It is therefore an object of the present invention to provide an information recording method which eliminates the problems with the conventional technique described above, can apply an arbitrary modulation method even when a recording film capable of high velocity crystallization (high speed erasure) is used, can obtain a fidelity reproduction signal corresponding to a recording signal and can attain high density recording with less remaining non-erasure.

In an information recording method which records information by using an information recording medium and by radiating a beam spot to the information recording medium while changing time-wise the power level of an energy beam within the range where the power level of the beam spot is equal to, or greater than the power required for reading of the recorded information, the object of the invention described above can be accomplished by the present method. The present method is carried out by changing time-wise the power level of the beam spot among to at least high, intermediate and low levels. Recording is carried out by a power waveform of a beam spot having a downward pulse towards the low level from the intermediate level before and/or after an upward pulse towards the high level from the intermediate level. The increment of the radiation energy of the upward pulse from the intermediate level to the high level is kept within the range of from 0.8 to 1.2 times the decrement of the radiation energy of the downward pulse from the intermediate level to the low level.

Unlike the conventional recording method which elevates at a stroke the power level from the intermediate level to the high level by the upward pulse when new information is recorded while erasing the existing information and then lowers it at a stroke to the intermediate level, the information recording method in accordance with the present invention includes a method which interposes the radiation time of a low level energy beam power between the intermediate level and the high level.

A typical example of the present invention is as follows. Namely, recording is carried out by using a conventional recording apparatus which is capable of producing at least three power levels and by modulating the power levels for a predetermined duration as described hereafter. The power of the energy beam is lowered from the intermediate level to the low level by the downward pulse, then returning it once to the intermediate level, keeping it at the intermediate level for a predetermined period, thereafter raising the power to the high level by the upward pulse and lowering it to the intermediate level. Alternatively, the power is at first raised from the high level by the upward pulse, is then kept at the intermediate level for a predetermined period, is lowered to the low level by the downward pulse and is thereafter raised to the intermediate level. To eliminate any remaining non-erasure, preferred is the method which makes recording by using first the downward pulse and then the upward pulse. In conjunction with high density recordability, however, since rapid heating is effected, preferred is the method which makes recording by using first the upward pulse and then the downward pulse. The intermediate power level between the upward pulse and the downward pulse may be different from the intermediate power level of other portions.

The holding time at the intermediate level between the upward pulse and the downward pulse may be omitted but can be set arbitrarily to a predetermined time. If the holding time is too long, however, the reproduction signal waveform will be divided into two parts. In the present invention, therefore, the holding time is preferably up to five times, and, more preferably up to three times the minimum width of the shortest upward pulse width and the shortest downward pulse width.

It is preferred that the energy increment from the rise of the power of the energy beam at the time of recording from the intermediate level to the high level till the return to the intermediate level (that is, the area on the time-vs-power diagram of the upward pulse towards the high level which is (the holding time)×(the power difference between the high level and the intermediate level) when the rise and fall of the power are sharp) is from 0.8 to 1.2 times, and more preferably from 0.9 to 1.1 times, the energy decrement of the energy decrement from the drop of the level from the intermediate level to the low level till the return again to the intermediate level ((the retention time at the low level)×(the power difference between the low level and the intermediate level)). When the upward or downward pulse is divided into two parts, the sum of their energy increments or decrements preferably satisfies the relation described above. Incidentally, this specification will deal with the case where the width of the upward pulse is equal to that of the downward pulse and the power level is divided into three equivalent levels, that is, the high, intermediate and low levels.

Incidentally, when a film having lower crystallization velocity than the recording film satisfying the formula (1) is used, the greater effect of reducing the remaining non-erasure can be obtained than the conventional method by reducing the energy decrement from the intermediate level by 20 to 90% of the energy increment. Besides the optical beam such as the laser beam, other beams such as an electron beam, an ion beam, etc., can be used as the recording energy beam depending on the properties of the recording film, and the recording medium may have other shapes than the disk such as a tape, a card, and so forth.

To eliminate the problems with the prior art technique described above, the information recording method in accordance with the present invention comprises effecting recording by use of a recording waveform having a portion (downward pulse) dropped to a lower level than the power level of an intermediate power level before and after an upward pulse towards a high power level from the intermediate power level of one energy beam in such a manner as to correspond to the rise or fall portion of the pulse of an original signal to be recorded.

To reduce any remaining non-erasure, it is preferred in the information recording method of the present invention that the decrement of energy from the intermediate power level ((the holding time at the low level)×(the power difference between the low and intermediate power levels) if the rise and fall of the power are sharp) be from 0.8 to 1.2 and more preferably 0.9 to 1.1 times the increment of energy from the intermediate power level ((the holding time at the high power level)×(the power difference between the high and intermediate power levels)).

If a recording film whose crystallization velocity is a bit lower than that of the recording film satisfying the formula (1) described above is used, any non-erasure area in the prior art technique can be reduced drastically by making the energy decrement from the intermediate power level by 20 to 90% smaller than the energy increment.

In the information recording method of the present invention, a reproduction pulse can be obtained only at the rise and fall portions of the pulse of the recording signal. In this recording waveform, whether the downward pulse exists before the upward pulse from the intermediate power level of the energy beam to the high power level or after the upward pulse in correspondence to the rise portion of the pulse of the recording signal may be stipulated at the beginning and is not particularly limitative. Incidentally, the position of the downward pulse relative to the upward pulse is set opposite at the fall portion of the pulse of recording signal.

In the information recording method of the present invention, similar effects can be obtained when the power is kept at the intermediate level between the upward pulse and the downward pulse for a predetermined period. In such a case, the holding time is preferably up to five times, and more preferably up to three times, the shorter one of the shortest pulse width of the upward and downward pulses.

Additionally, the maximum value or minimum value of the reproduction signal voltages need not always correspond (synchronize) time-wise in correspondence to the rise and fall portions of the pulse of the recording signal, but it may be deviated in all reproduction signal voltages by an arbitrary time.

As is well known, a recording method which uses a so-called "rewritable" recording medium for recording new information while erasing previous information effects recording by providing reversibly an optical change to the recording film by the magnitude of the energy power at the time of recording and its change pattern with time. If a recording film which utilizes the phase change between the crystalline state and the state approximate to the amorphous state is used, for example, a pulse-like reproduction waveform, in a positive direction can be obtained. In particular, the power level of the radiation energy is lowered pulse-wise at the time of recording to a low level by a downward pulse and then returned to an intermediate level, retaining it at the intermediate level for a predetermined period and thereafter raising it to a high level by an upward pulse. As a result, almost all the areas radiated by the beam having such a change are strongly crystallized. However, whether the reproduction waveform becomes a pulse in the positive direction or in the negative direction is determined by the film thickness of the recording film. Accordingly, the description will be hereby given about the case of the film thickness where the reproduction signal voltage becomes high when the film is crystallized. If recording is carried out by raising the power at a stroke from the intermediate level to the high level, retaining it once at the intermediate level for a predetermined period and thereafter lowering it to the low level by the downward pulse, almost all the areas are rendered amorphous and a pulse-like reproduction waveform in the negative direction can be obtained.

The length of the crystalline portion or amorphous portion can be changed and the width of the reproduction pulse waveform can be changed by changing the holding time at the intermediate power level between the upward pulse for raising the power to the high level and the downward pulse for lowering it to the low level in accordance with the length of the pulse of the original signal to be recorded. Accordingly, a fidelity reproduction signal can be obtained when a signal whose pulse length changes is recorded, too.

If the decrement of energy reduced to the low level from the intermediate level by the downward pulse is made substantially equal to the increment of energy increased from the intermediate level to the high level by the upward pulse, the following phenomenon, that will occur otherwise when this difference is made great, can be avoided. That is, the phenomenon is the problematic distortion of the reproduction waveform resulting from the rise and drop of temperature which is gentle and great at the start and end of the portion which is highly likely to be at the high or low power level.

In accordance with the present invention, there can be obtained the effect that any remaining nonerasure is reduced because expansion of the strongly crystallized area or the area rendered amorphous in a direction orthogonal to the recording track is less.

The pulse-like change of the reproduction signal voltage can be controlled to be either in the positive or negative direction depending on whether the level is lowered in advance to the low level from the intermediate level before the rise to the high level, or lowered to the low level from the intermediate level after the level is raised to the high level. Accordingly, three-value recording can be made, too, and recording which changes the reproduction signal voltage in the positive direction at the rise portion of the original signal and in the negative direction at its fall portion can be carried out.

Though the description given above deals with the use of the crystalline - amorphous phase change optical recording medium, the present invention is also effective for a recording medium using the amorphous - amorphous phase change, a crystalline - crystalline phase change recording medium such as the change of the crystal shape or crystal grain diameter. The present invention can be applied to an opto-magnetic recording medium as well.

The recording medium to be used in the present invention may be those recording films which have a high reversible phase change velocity providing such an optical change, but the present invention is particularly effective when the recording film consists of a chalcogen compound containing 30 to 85 at % of at least on element selected from the group of Te, Se and S.

In the recording waveform of the present invention, the temperature of the recording film at its radiated portion can hardly follow if the power level is changed to another arbitrary level (e.g. 0 level or read power level) for a short period and substantially the same result can be obtained as when such a change does not exist. It is of course possible, on the other hand, to superpose a high speed change which the temperature of the recording film can hardly follow, on the recording waveform of the present invention so that the change of the mean power becomes the pattern of the present invention described already.

When recording is carried out by using at least two laser beams (at least two beam spots) and radiating the same or different patterns, the present invention can naturally be applied to at least one of such laser beams.

When a recording film which utilizes the phase change between the crystalline state and the state approximate to the amorphous state is employed, almost all the portions radiated by the recording beam are crystallized and a pulse-like reproduction waveform in a positive direction (in the direction where a reproduction voltage increases) if recording is carried out by use of a recording waveform having a portion lowered to a low power level from an intermediate power level (downward pulse) before an upward pulse from the intermediate power level to a high power level in such a manner as to correspond to the rise portion of the pulse of the recording signal, for example. However, whether the pulse is the one in the positive direction or in the negative direction is determined by the film thickness of the recording film. Therefore, the description will be given about the case of the film thickness where the reproduction signal voltage becomes high when the film is crystallized. If recording is carried out by raising the laser power to the high power level from the intermediate power level and then reducing it to the low power level lower than the intermediate power level, almost all the areas of the portions radiated by the recording beam change to the state approximate to the amorphous state and a pulse-like reproduction signal in the negative direction can be obtained.

The width of the reproduction pulse, waveform can be changed by changing the holding time at the intermediate power level between the upward pulse and the downward pulse to change the length of the crystalline portion or the amorphous portion.

If the energy decrement from the intermediate power level is made substantially equal to the energy increment from the intermediate power level, the following phenomenon that will otherwise occur when this difference is made great can be avoided. The phenomenon is the problem of distortion of the reproduction waveform resulting from the rise and drop of a temperature which is gentle and great at the start and end of the portion which is highly likely to be at the high or low power level.

According to the information recording method of the present invention, excessive expansion of the area which is strongly crystallized or rendered amorphous in a direction orthogonal to the recording track is less. Therefore, any remaining non-erasure can be reduced. Particularly in the case of the recording signal having a portion at which the high power level continues, recording pulses are produced only at the rise and fall portions of the recording signal so that the effect described above is remarkable and high density recording can be conducted.

When the time at the high power level is short, the recording waveform may be the one that has the low power level portion before and after the upward pulse towards the high power level from the intermediate power level. In this case, too, the energy decrement and the energy increment are preferably made equal to each other.

Though the description given above explains the use of a crystalline - amorphous phase change type optical recording medium, the present invention is also effective for a recording medium utilizing the change between amorphous - amorphous state and a crystal - crystal phase change type recording medium such as a change of the crystal shape or a crystal diameter. The present invention can also be applied to an opto-magnetic recording medium. The present invention is particularly effective for a recording film consisting, as a principal component, of a chalcogen compound containing 30 to 85 at % of at least on element selected from the group of Te, Se and S (e.g. a recording film consisting principally of In-Se or Ge-Sb-Te), a recording film consisting of In-Sb as the principal component and an opto-magnetic recording film consisting of Tb-Fe-Co as the principal component.

In the recording waveform in the information recording method of the present invention, if the power level is changed to another arbitrary power level (e.g. 0 level or a read power level) for a short period, the temperature of the recording film of the portion radiated by the energy beam can hardly follow the change and substantially the same effect can be expected as when such a change does not exist.

DESCRIPTION OF THE PREFERRED EMBODIMENTS

Hereinafter, the present invention will be described in further detail with reference to some preferred embodiments thereof.

Embodiment 1:

First of all, an optical disk medium having an In-Se-Tl-Co recording film capable of rewriting information by overwrite (rewrite by overwrite) through a crystalline-amorphous phase change by one laser beam and also having a 130 mm diameter was rotated at 1,200 rpm, and automatic focusing and tracking were carried out while a semiconductor laser beam (a continuous beam of a wavelength 830 nm) of an intermediate power level (12 mW) was being radiated onto the recording track to make initialization (into erase state).

Figure 1A:
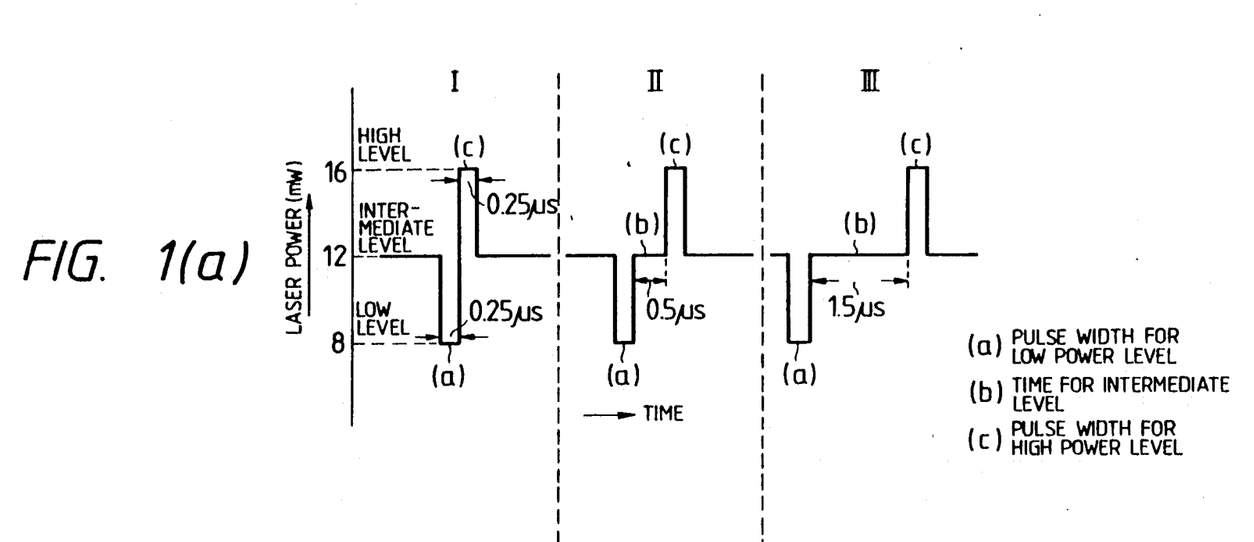
FIG. 1(a) is a diagram showing the shift with time of a laser power radiation in one embodiment of the present invention.

The portions to be recorded were confirmed while automatic focusing and tracking were being carried out onto the initialized recording track at a read (reproduction) power level (1 mW), and power was then raised and recording was conducted separately by three kinds of laser pulse waveforms such as represented by I, II and III in FIG. 1(a). In other words, FIG. 1(a) shows the shift with time of the laser power radiation when the pulse was once kept for a predetermined period (downward pulse) at a low power level (low level), lower than an intermediate power level (intermediate level) which is between the high and low power levels, before the application of a pulse (upward pulse) at a high power level (high level). Here, the radius of a recording track was 45 mm, the power of the intermediate level was 12 mW, the power of the high level was 16 mW and the power of the low level was 8 mW. The holding time (a) and (c) at the low and high levels was 0.25 $\mu$s constant, respectively. The retention time at the intermediate level between the high and low levels was (b). The holding time (b) in I, II and III was 0 s, 0.5 $\mu$s and 1.5 $\mu$s, respectively.

Figure 1B:
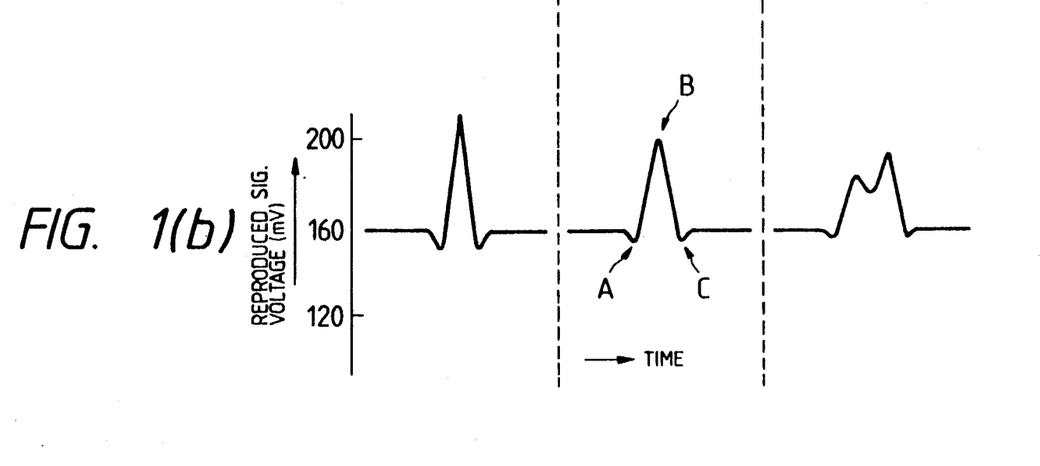
FIG. 1(b) is a diagram showing the shift with time of a reproduction waveform when recording is made by the laser pulse waveform shown in FIG. 1(a)
Figure 2A:
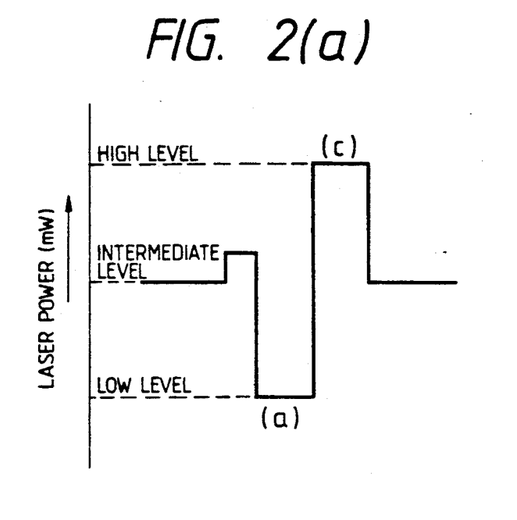
FIGS. 2(a) to 2(d) are diagrams showing the shift with time of the laser power radiation in modified examples of the recording waveform.
Figure 2B:
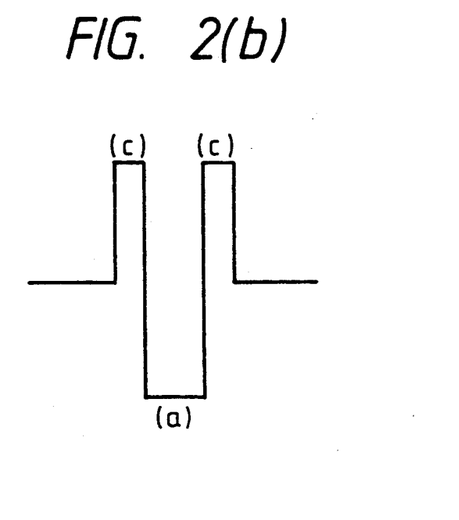
Figure 2C:
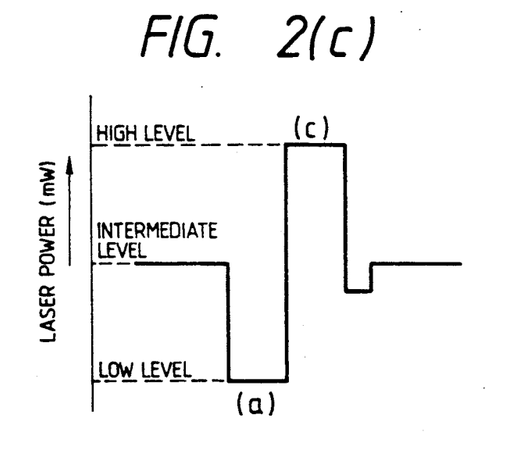
Figure 2D:
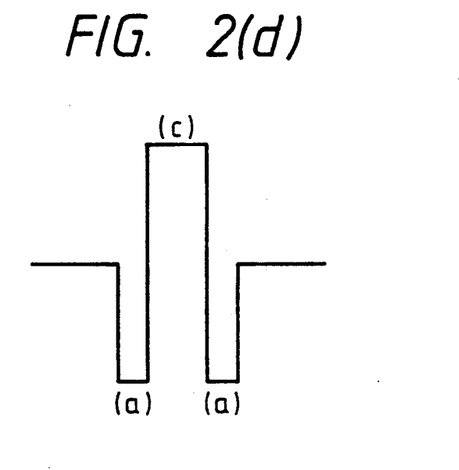

FIG. 1(b) shows the corresponding reproduction waveforms when recording was made by the laser pulses shown in FIG. 1(a). As to the time relation, the recording waveform and the reproduction waveform did not necessarily correspond to each other. In I, first of all, the laser power level was once lowered from the intermediate level, i.e. 12 mW, to the low level, i.e. 8 mW. When the laser beam was continuously radiated at 12 mW as the intermediate level, the melting point of a recording film was reached near the center of the beam spot. Therefore, when the laser power level was once lowered to the low level, the recording film was quenched and an area close to the amorphous state became great, and along therewith, a reproduction voltage dropped. Incidentally, if crystallization occurred in this film, the reproduction voltage rose and if the film was rendered amorphous, the reproduction voltage dropped. After the level was kept at the low level for 0.25 $\mu$s, the laser power was then raised to 16 mW as the high power level. Accordingly, the recording film was heated rapidly and it was estimated that crystallization started occurring at the point of time where the temperature exceeded the crystallization temperature with the result being in the increase in the reproduction voltage. It was estimated also that the amorphous state started occurring when the temperature exceeded the melting point of the recording film. Since the crystallization velocity of this film was high, re-crystallization started while the film was being cooled so that the increase in the amorphous area was not believed to be great. Accordingly, though the reproduction voltage dropped, the rate of the drop was not much great. Incidentally, both the rise and fall portions of the laser power were not perpendicular but had some inclination. A unidirectional pulse-like reproduction waveform corresponding to the crystallization was thus obtained through these processes as shown in I of FIG. 1(b). It was estimated that almost all the portions radiated with the laser beam were the crystallized area.

Next, the description will be made about the case where the laser power level was kept at the intermediate level (b) between the low level (a) and the high level (c) such as the recording waveform of II in FIG. 1(a). The difference of this case from I of FIG. 1(a) resided in that the temperature rise of the recording film due to the heat during the shift from the low level to the high level was gentle. This was because the laser power level was kept at the intermediate level (b) for a predetermined period. When recording was effected by such a recording waveform, a pulse-like waveform in a higher direction of a voltage having a time-wise greater width than the reproduction waveform of I in FIG. 1(b), as shown by II in FIG. 1(b) could be obtained. Here, the shape of the reproduction waveform could be controlled by changing the power level of each of the low, intermediate and high levels and the holding time. For example, if the power of the low level of II in FIG. 1(a) was reduced and the holding time was prolonged, the A portion of the reproduction waveform moved towards the direction (the direction of the amorphous state) where the reproduction voltage became small and the voltage of the B portion became high (the direction of crystallization). If the holding time (b) at the intermediate level was extended, the width of the reproduction waveform became time-wise great. However, if the holding time (b) at the level was extended, the voltage became small and the waveform was divided into waveforms as represented by the reproduction waveform of III in FIG. 1(b).

In this embodiment, therefore, the holding time (b) at the intermediate level preferred be set to about 1 μs which was four times the pulse width (a), (c) of the high and low levels (0.25 μs for each). Furthermore, if the power of the high level was increased and the holding time was extended, the voltage of the B portion of the reproduction waveform became high (the direction of crystallization) and the voltage of the C portion dropped due to the influences of quenching after accumulation of the heat. It is therefore effective to divide the pulse into a plurality of pulses of the holding time at the high level is to be extended. It was hereby assumed that the amorphous area was great at the positions corresponding to the A and C portions on the recording film and the crystalline area was great at the positions corresponding to the B portion.

As described, if the holding time (b) of the intermediate level was set arbitrarily, it became possible to obtain with fidelty a reproduction waveform corresponding to such signal whose pulse width changed, such as a digital signal in which the portion having one "1", the portion having two continuous "1" and the portion having three continuous "1" were co-present, for example, although the conventional technique could not obtain such a reproduction waveform. Since this embodiment could prevent the amorphous area from becoming unnecessarily great, an unerased portion became smaller than by the conventional method. The power ratio between the high power level and the intermediate power level was set preferably from 12:7 to 12:11 and a particularly excellent result could be obtained within the range of from 12:0 to 12:10.

Furthermore, overwrite with less non-erasure could be made in the recording waveform in the diagram of the shift with time of the laser power radiation shown in FIGS. 2(a) to (d) as a modified example of the recording waveform shown in I of FIG. 1(a). It was preferred in such a case, too, that the increment of energy from the intermediate level (the product of the power change component by the time width) balanced with the sum of the decrement of energy in FIG. 1(a). A good result could be obtained when one was from 0.8 to 1.2 times the other and the best result could be obtained when one was from 0.9 to 1.1 times the other.

Incidentally, it was preferred in the case of the optical disk that the upper limit of the holding time of the intermediate level and the pulse width of each of the upward and downward pulses were shorter in inverse proportion to its number of revolution. Here, if a recording film having a considerably low crystallization velocity was used, the decrement of energy from the intermediate power level was made smaller by 20% to 90% than the increment, in order to prevent the amorphous area from becoming great and the unerased portion from becoming great, as well.

Figure 3A:
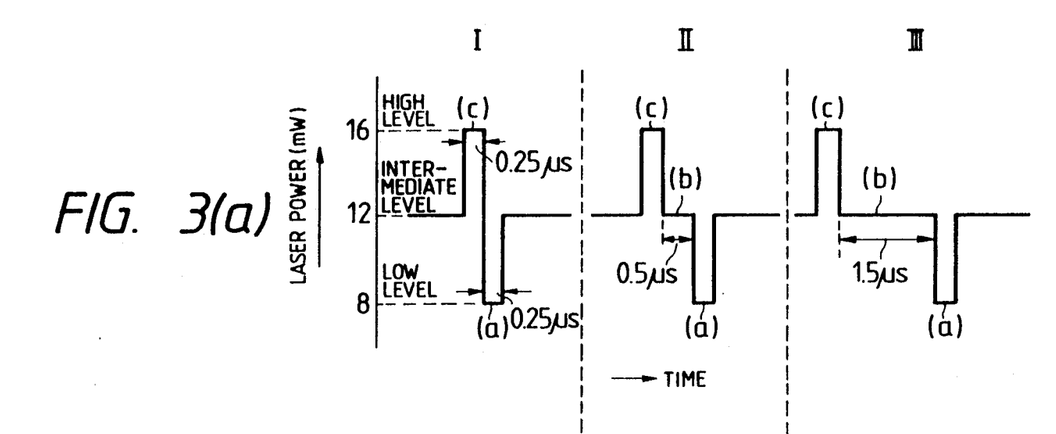
FIG. 3(a) is a diagram showing the shift with time of the laser power radiation in another embodiment of the present invention.
Figure 3B:
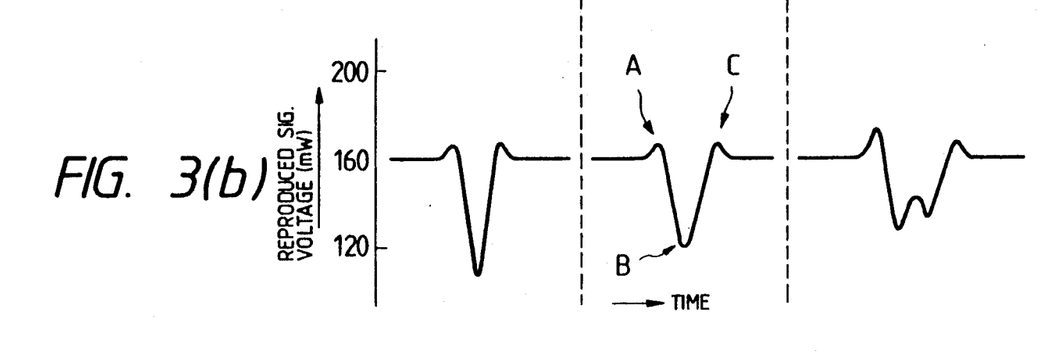
FIG. 3(b) is a diagram showing the shift with time of the reproduction waveform when recording is made by the laser pulse waveform shown in FIG. 3(a)

Embodiment 2:

FIGS. 3(a) and 3(b) show another embodiment of the present invention, wherein the recording film and the number of revolution of the disk were the same as those of Embodiment 1.

FIG. 3(a) is a diagram showing the shift with time of the laser power when a pulse was kept at the low power level lower than the intermediate level (downward pulse) for a predetermined time after the pulse to the high level (upward pulse). In the same way as II and III, of FIG. 1(a) of Embodiment 1, the holding time (b) at the intermediate level between the upward pulse and the downward pulse was changed in II and III of FIG. 3(a).

Here, the high level, the intermediate level and the low level were 16 mW, 12 mW and 8 mW, respectively, and the holding time at the high and low levels (a) and (c) was each 0.25 μs constant. The holding time at the intermediate level (b) between the upward and downward pulses was 0 s for I, 0.5 μs for II and 1.5 μs for III.

FIG. 3(b) shows the corresponding reproduction waveforms when recording was effected by the laser pulse waveforms shown in FIG. 3(a). First of all, in I, the power level was raised from 12 mW as the intermediate level to 16 mW as the high level, as done in the conventional method. In this embodiment, however, the power level was lowered to 8 mW as the low level (downward pulse) after raising the power level. It was therefore estimated that the crystalline area became small while the amorphous area became great and the reproduction waveform became such as the one represented in I of FIG. 3(b). A pulse-like reproduction waveform in a low voltage direction having a great width could be obtained by keeping the power level at the intermediate level for a predetermined (b) as represented by the recording waveform in II of FIG. 3.

Furthermore, the shape of the reproduction waveform could be controlled by changing the recording pulse waveform in the same way as in Embodiment 1. For example, if the high level power of II in FIG. 3 was elevated and the retention time was prolonged, the slow heating time became great and its was estimated that the crystalline area increased in the A portion and the reproduction voltage became high. However, when the power was lowered from the high level to the intermediate level, it was estimated that the amorphous area increased in the B portion because accumulation of heat was great. In other words, the reproduction voltage at the B portion became low. When the holding time (b) at the intermediate level was extended, there could be obtained a pulse-like reproduction waveform in a low voltage direction having a time-wise great width. However, if the holding time was extended too much in the same way as in Embodiment 1, the waveform was divided into two forms as represented by the reproduction waveform of III in FIG. 3. It was therefore preferred in this embodiment, too, to set the holding time (b) of the intermediate level to about 1 μs which was about four times the pulse width (0.25 μs) of the high and low levels. Furthermore, if the power of the low level was lowered and the holding time (a) was extended, the B portion of the re-production waveform became further lower and the C portion became higher.

As described above, it was possible to obtain a fidelity reproduction waveform corresponding to the recording signal such as a signal whose pulse width changed, e.g. a digital signal in which the portion where "1" was one, the portion where two "1" continued and the portion where three "1" continued were co-present. The present waveforms could not be obtained by the conventional method, in which the holding time (b) of the intermediate level is arbitrarily set.

Figure 4A:
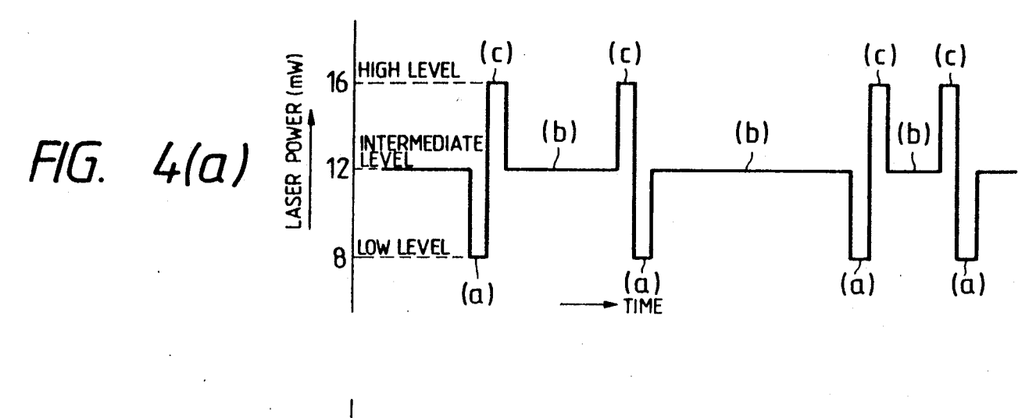
FIGS. 4(a) and 4(b) are diagrams showing the shift with time of the recording waveform and reproduction waveform in an example of three-value recording as still another embodiment of the present invention.
Figure 4B:
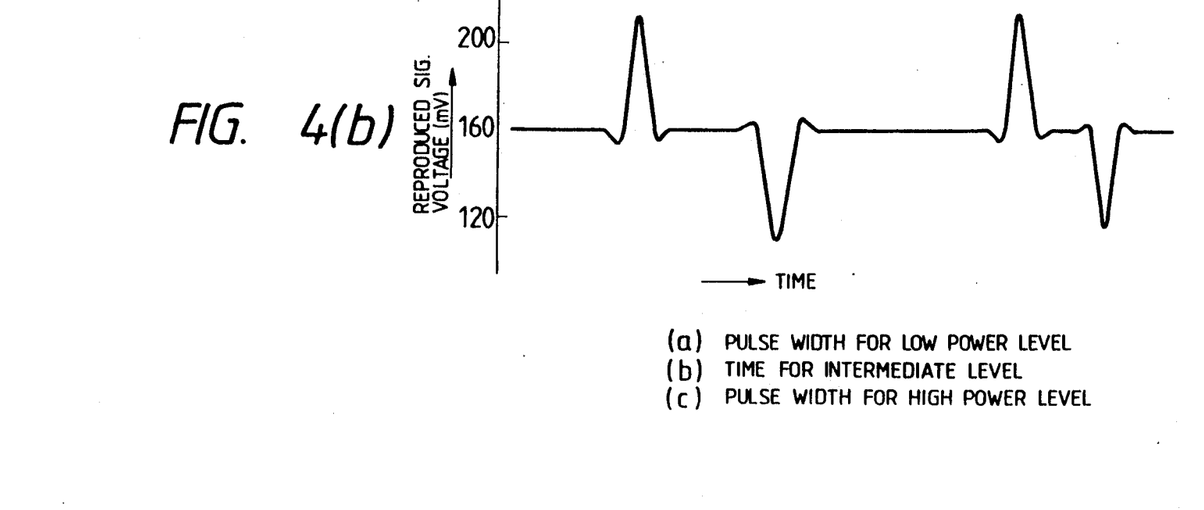

Embodiment 3:

Recording of an original signal assuming three values whose reproduction signal assumed the three values of a high voltage, a low voltage and an intermediate voltage (corresponding to the intermediate area between the crystalline area and the amorphous area) could be made by use of recording waveforms obtained by combining Embodiments 1 and 2 described above, as shown in FIGS. 4(a) and 4(b). In other words, FIG. 4(a) is a diagram showing the shift with time of the laser power radiation and FIG. (9b) is a diagram showing the shift with time of the corresponding reproduction signal.

In the case of recording of an original recording signal assuming two values, high density recording of the system detecting the edge (pit edge) of the portion where "1" continued could be made by conducting recording in a manner described below. In one of them, a downward laser pulse was generated before an upward pulse at the portion where the high level of the original signal (e.g. "1" of the digital signal) started and a downward laser pulse was generated behind the upward pulse at the portion where the high level ended, and a reproduced signal having upward pulse where the high level of the original signal started and downward pulse where the high level ended. In another, a downward laser pulse was generated behind the upward pulse where the high level of the original signal started, and a downward laser pulse was generated before an upward pulse at the portion where the high level ended, and a reproducing signal having the downward and upward pulses at the starting and ending portions, respectively.

The preferred range of the ratio of the energy of the increment from the intermediate level to the energy of the decrement was the same as that of Embodiment 1.

Figure 5A:
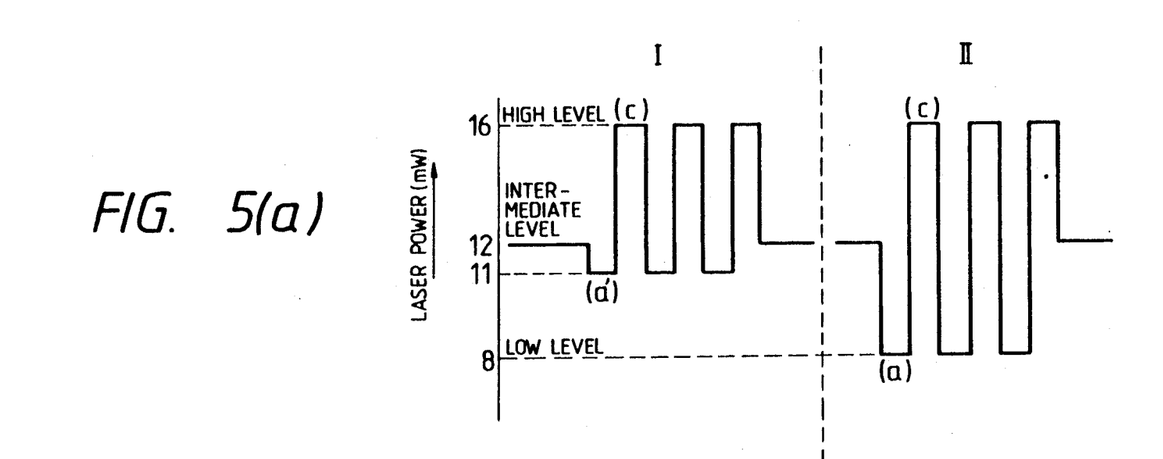
FIG. 5(a) is a diagram showing the shift with time of the laser power radiation in still another embodiment of the present invention.
Figure 5B:
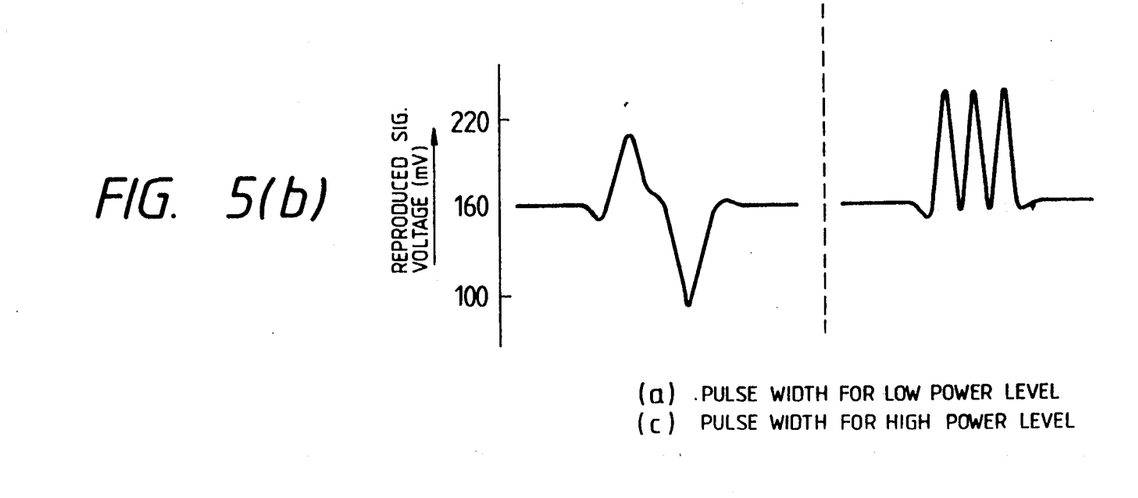
FIG. 5(b) is a diagram showing the shift of the reproduction waveform when recording is made by the laser pulse waveform shown in FIG. 5(a)

Embodiment 4:

FIGS. 5(a) and 5(b) show still another embodiment of the present invention.

FIG. 5(a) is a diagram showing the shift with time of the laser power obtained by using apparatus having the electronic device which modulates the laser power among more than three power levels when the recording waveform of I of Embodiment 1 was generated continuously. Here, the holding time (a), (a') and (c) of the low and high power levels each was kept at 0.25 μs constant. Reference I in FIG. 5 represents an example where the difference between the low power level and the intermediate level was reduced. By so doing, the reproduction waveform became such as the one represented by I in FIG. 5(b) from the relation of the cooling rate of the recording film when the recording film having the same crystallization velocity as that of Embodiment 1 was used. The signal waveform did not correspond to the recording waveform. When the difference between the intermediate level and the high level was made equal to the difference between the intermediate level and the low level as in the case I of Embodiments 1 and 2, there could be obtained a reproduction waveform represented by II in FIG. 5(b). This represented that the reproduction waveform having the highest fidelity to the recording waveform could be obtained when the energy increment at the time of rise from the intermediate level ((difference between the high and intermediate levels) × (retention time at the high level)) was made substantially equal to the energy decrement during the period in which the power level was once lowered from the intermediate level and was then returned again to the intermediate level ((difference of the absolute values between the low and intermediate levels) × (retention time at the low level)).

If the holding time at the high level was made longer than the holding time at the low level while keeping the energy increment and the energy decrement substantially equal to each other as described above, it was possible to reduce remaining non-erasure. It might be possible at this time to bring the low level infinitely closer to the 0 level, or read reproduction power level but because a higher level was used for recording, a level higher than these low levels was used.

Though the holding time (b) at the intermediate level was 0 sec as shown in II of FIG. 5(a), the same result could be obtained when the holding time was up to about 1 μs.

If a recording film having a little bit lower crystallization velocity was used, a fidelity reproduction waveform to the recording waveform could be obtained even if either the energy increment or the energy decrement was a bit smaller, particularly when the energy decrement was smaller. Good results could be obtained similarly in this embodiment as well as in Embodiments 1 through 3 when an opto-magnetic recording film the direction of magnetization, in which changed depending upon the heating/cooling rate, was used.

The present invention embraces within its scope the application of the laser power modulation method described in this Embodiment as well as in the foregoing Embodiments 1 in 3 to the case where at least two laser beam spots are used so as to verify as to whether or not overwrite could have been made correctly (or to read out the previous recording and to make recording once again if any error exists) by use of one of them; in the case where the power of the beam for verification is modulated in order to eliminate any remaining non-erasure; and in the case where erasure is made by one of the beams and write is made by the other, as the power modulation method of at least one beam.

The present invention can obtain with fidelity the reproduction signal corresponding to the recording signal even if the crystallization velocity changes remarkably due to the variance of the composition of the recording film or even if the linear velocity of the disk changes, and for this reason, the invention can be applied to digital signals in which the portion having one "1" and the portions having continuous "1" are co-present. Accordingly, the present invention can drastically expand the allowable range of the film composition of the recording film. Three-value recording can also be made in accordance with the present invention because a reproduction waveform having the values of the high, low and the intermediate voltages can be obtained by changing time-wise the sequence of the upward pulses and the downward pulses. The recording method of the present invention can prevent the amorphous area and the crystalline area from becoming unnecessarily great so that the invention can eliminate much more any remaining non-erasure than the conventional method.

Still another embodiment of the present invention will be described with reference to FIGS. 6 to 8.

Figure 6A:
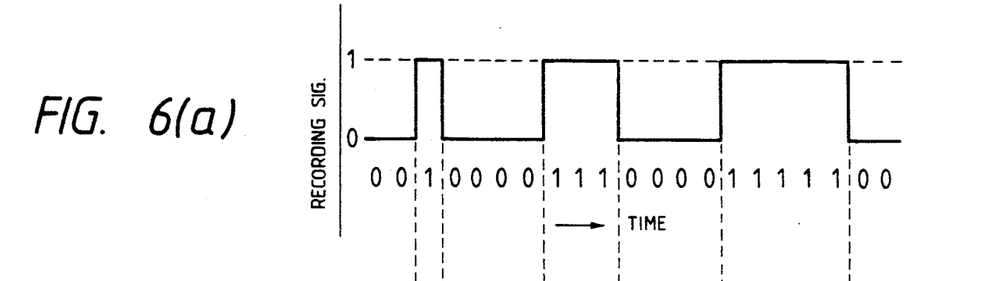
FIGS. 6(a)-6(c) are diagrams showing the relation between the recording waveform and the reproduction waveform illustrated in the embodiments of the present invention.
Figure 6B:
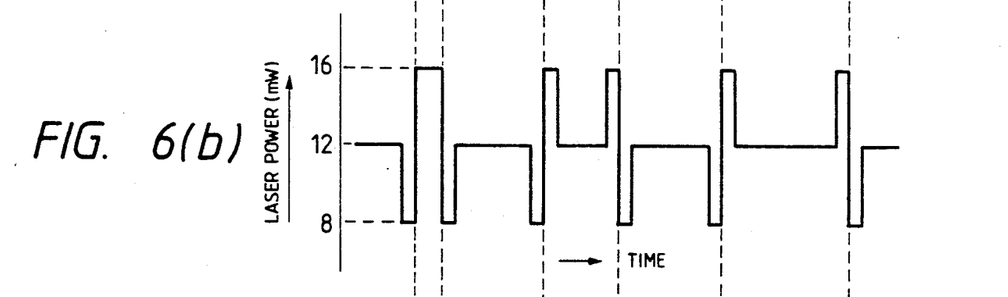
Figure 6C:
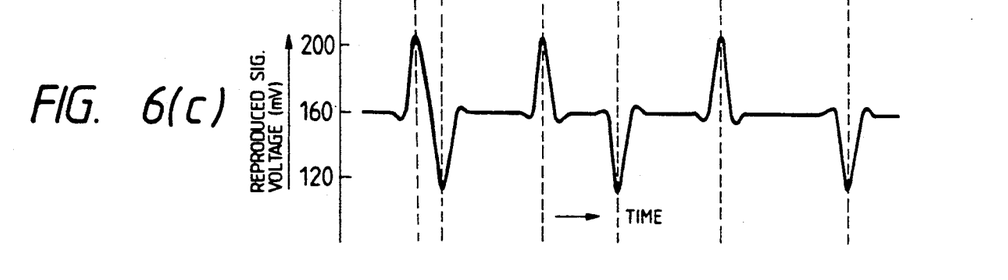
Figure 7A:
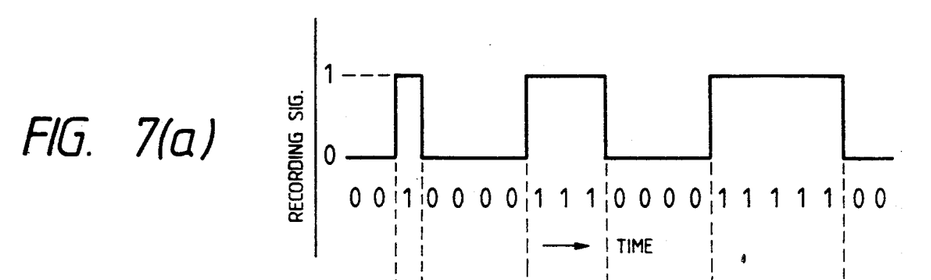
FIGS. 7(a) through 7(c) and 8 are diagrams showing the relation between the recording waveform and the reproduction waveform when the recording waveform in FIG. 1 is modified.

FIG. 6 shows an example of the information recording method of the present invention. First of all, an optical disk medium having an In-Se-Tl-Co recording film and having also a diameter of 130 mm was rotated at 1,200 rpm. Automatic focusing and tracking were carried out onto a recording track. A semiconductor laser beam (continuous beam of a wavelength 830 nm) of an intermediate power level (12 mW) was radiated for initialization. The portions to be recorded were confirmed by carrying out automatic focusing and tracking onto the initialized recording track at a read power level (1 mW) and recording was carried out by moving up and down the laser power so as to obtain the recording waveform shown in FIG. 1(b) on the basis of the signal to be recorded in FIG. 1(a). Here, the radius of the recording track was 45 mm, and the power of the intermediate power level, the power of the high power level and the power of the low level lowered from the intermediate power level were 12 mW, 16 mW and 8 mW, respectively. Here, recording was carried out by the recording waveform having a downward pulse at the lower power level than the intermediate power level before and after the upward pulse towards the high power level at the rise and fall portions of the recording signal, respectively. In the case of such a signal in which two or more "1" did not continue (or a signal in which "0" always appeared after "1"), recording was made by use of the recording waveform having a downward pulse having a lower power level than the intermediate power level before and after the downward pulse from the intermediate power level to the high power level.

In order to reduce any remaining non-erasure due to rewrite in the recording waveform at the rise and fall portions of the recording signal, it was preferred that the decrement of energy from the intermediate power level to the lower power level was 0.8 to 1.2 times the increment of energy from the intermediate power level to the higher power level, and more preferred was from 0.9 to 1.1 times. FIG. 1(b) shows the case of 1.0 time.

FIG. 6(c) shows the corresponding waveforms (voltages) when recording was carried out by the recording waveforms shown in FIG. 6(b). In this recording film, the reproduction voltage became high when the film was crystallized and became small when the film was rendered crystalline. The time relation between the recording waveforms and the reproduction waveforms did not necessarily correspond to one another correctly. In other words, in the case of recording of an original signal in which two or more "1" are not continuous, there could be obtained a reproduction waveform which had less remaining non-erasure by the combination of a pulse in a positive direction and a pulse in a negative direction. The reproduction waveform; was approximate to the differential waveform of the original signal waveform when the recording waveform was kept at the low power level for 125 ns before and after the upward pulse (pulse width=250 ns) towards the high level from the intermediate power level. In the case where "1" of the original signal to be recorded is continuous, recording was carried out by use of a recording waveform whose power changed only at the rise and fall portions of the recording signal such as the one shown in FIG. 7(b). For example, the laser power was once reduced from the intermediate power level to the low power level at the rise portion of the recording signal. Due to the continuous radiation of 12 mW as the intermediate power level, the recording film reached the melting point near the center of the beam spot. When the laser power was lowered once to the low power level as described above, the recording film was quenched and the area close to the amorphous state became great, and the reproduction voltage dropped along therewith. After the laser power was kept at the low power level for 125 ns, it was then raised to 16 mW as the high power level. In consequence, the recording film was rapidly heated and crystallization was believed to occur from the point time where the crystallization temperature was exceeded. Thus, the reproduction voltage rose. It was believed further that the shift to the amorphous state occurred from the point of time when the temperature exceeded the melting point of the recording film. However, since the crystallization velocity of this recording film was high, re-crystallization started while the film was being quenched and it was believed that the amorphous area did not much increase. Accordingly, the reproduction voltage dropped gradually but the drop was not much remarkable.

Incidentally, the rise and fall portion of the laser power were not practically perpendicular but had some inclination. A pulse-like reproduction waveform in a positive direction corresponding to the crystallization was obtained through the process described above. It was estimated that the portion of the recording film corresponding to the rise portion of the recording signal was under the state which was substantially approximate to the crystallization state. At the fall portion of the recording signal, on the other hand, the laser power was raised from 12 mW as the intermediate power level to 16 mW as the high power level. Therefore, the recording film was heated rapidly and started to crystallize, but since the power level was lowered to 8 mW as the low power level after being kept at the high power level for 125 ns, the change to the amorphous state started at an early stage and the portion radiated with the recording beam was believed to have an area which was after all approximate to the amorphous state. In consequence, a pulse-like reproduction waveform in the negative direction could be obtained. It was further estimated that the recording film of the portion corresponding to the rise portion of the recording signal was mostly under the state approximate to the amorphous state. As described above, the reproduction waveform such as shown in FIG. 6(c) which corresponded to the recording signal of FIG. 6(a) could be obtained with fidelity by using the recording waveforms such as shown in FIG. 6(b).

In other words, the pulse waveform was the one which was in the direction of the increase in the reproduction voltage at the rise portion of the recording signal and the one which was in the direction of the decrease in the reproduction voltage at the fall portion.

FIG. 7 shows the modified waveforms of the recording waveforms shown in FIG. 6(b). Here, recording was carried out by the recording waveform having a downward pulse at the lower power level than the intermediate power level after and before the upward pulse towards the high power level at the rise and fall portions of the recording signal, respectively. In other words, a reproduction waveform opposite to the one shown in FIG. 6(c) could be obtained, and it was the pulse-like reproduction waveform in the negative direction corresponding to the change to the amorphous state and was the pulse-like reproduction waveform in the positive direction corresponding to crystallization at the fall portion of the recording signal.

Figure 8A:
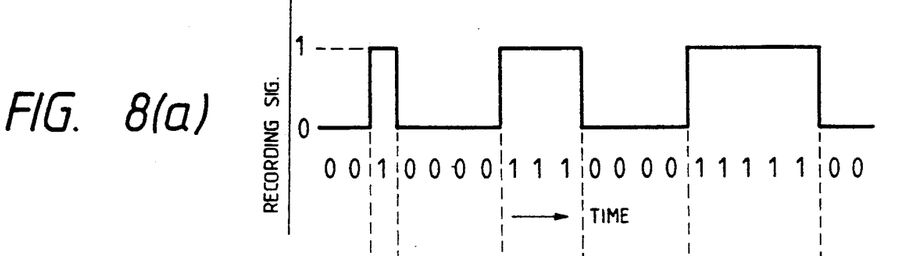
Figure 8B:
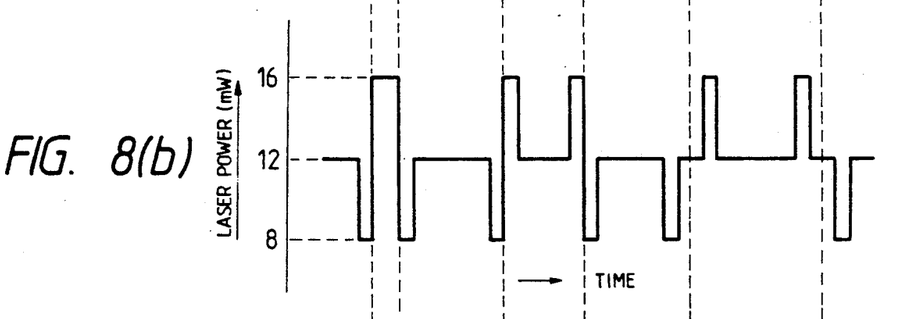
Figure 8C:
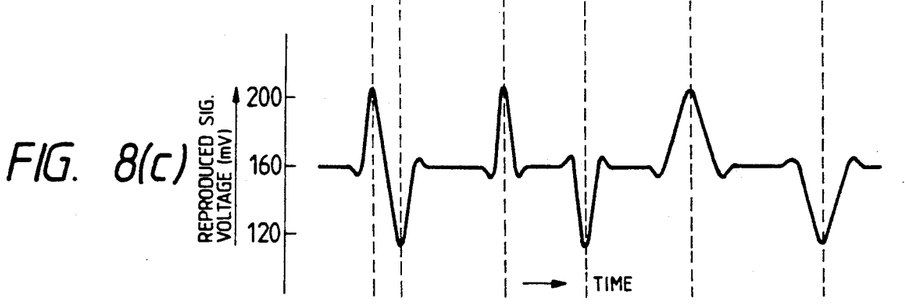

FIG. 8 shows the case where the portion of the recording signal where five "1"0 continued. The power level was kept at the intermediate power level for a predetermined time between the rise pulse and the fall pulse from the intermediate power level in the recording waveform, for example, that of FIG. 6. Since it was thus held at the intermediate power level for a predetermined period, the temperature rise of the recording film due to the heat the time of the rise from the lower level to the high power level became gentle. As shown in FIG. 8(c), therefore, there could be obtained a unidirectional pulse-like reproduction waveform having a greater time width than the reproduction waveform of FIG. 6(c), as shown in FIG. 8(c). Here, the holding time intermediate power level was 250 ns, and the width of the reproduction waveform could be controlled to certain extents by controlling this holding time.

Figure 7B:
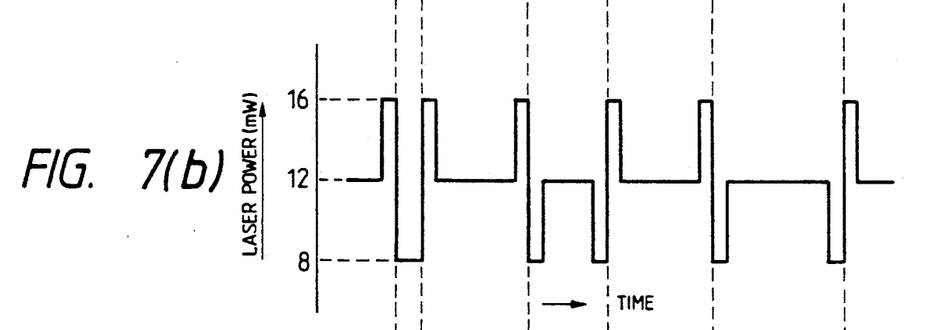
Figure 7C:
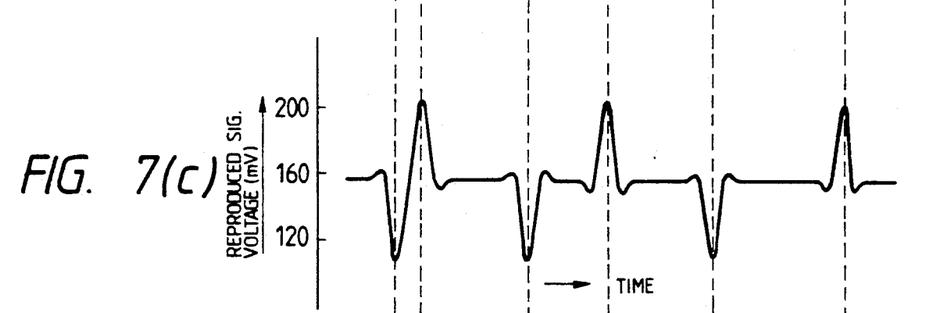

In FIGS. 7(b) and 8(b), too, the increment and decrement of energy from the intermediate level were made equal to each other.

Even when recording was carried out by use of the recording waveform of any of those shown in FIGS. 6(b), 7(b) and 8(b), a drastic change of the heat existed only at the rise and fall portions of the recording signal and since the expansion of the amorphous portion due to the accumulation of heat, which was often observed in the conventional recording method when "1" continued, was less. In consequence, remaining non-erasure due to rewrite was less. Furthermore, since the unidirectional pulse-like reproduction waveform could be obtained with fidelity in response to the rise and fall portions of the pulse of the recording signal, it was no longer necessary to dispose a differential circuit that had been required conventionally.

In accordance with the information recording method of the present invention, recording is made in such a manner as to generate the reproduction pulses in the mutually opposite directions at the rise and fall portions of the pulse of the recording signal. Accordingly, high density recording of the system which detects the edge of the portion where "1" continues (pit edge) is possible. When a recording film having a little bit lower crystallization velocity is used, the energy decrement from the intermediate power level is made smaller by 20 to 90% than the energy increment, in order to prevent the amorphous area from becoming great and to prevent also remaining non-erasure from becoming great.

In this embodiment, good results could likewise be obtained when an opto-magnetic recording film, in which, the direction of magnetization changed depending on the rate of heating and cooling, was used.

Needless to say, the present invention embraces within its scope the application of the laser power modulation method of this embodiment in the case where at least two laser beam spots are used so that overwrite is made by one of them and verification as to whether or not overwrite has been made correctly is made by the other beam; in the case where any remaining non-erasure is eliminated by modulating also the power of the beam; used for verification; and in the case where erasure is made by one of the beams and write is made by the other, as the power modulation method of at least one beam.

In this embodiment, the recording waveform in the case where "1" continued for the shortest period (e.g. only one "1") had the waveform obtained by connecting the recording pulse waveforms of the rise and fall portions of the portion where "1" continued long, but this was not necessary. There are cases where better results can be obtained by changing it to a little bit different waveform depending on the characteristics of the recording film. In such a case, it is preferred that the recording laser pulse waveform is close to one which has a downward pulse before and behind an upward pulse.

Though the low power level was different from the read power level in this embodiment, the formation of the recording pulse became easier by changing the width of the downward pulse towards the low power level so as to bring the low power level into conformity with the read power level or the 0 level.

As described above in detail, the information recording method of the present invention makes recording by the waveform having the portion which is lowered to the low power level either before or after the upward pulse from the intermediate power level to the high power level in such a manner as to correspond to the rise and fall portions of the pulse of the recording signal. Therefore, even in the case of the recording signal where "1" continues the present invention can prevent the expansion of the amorphous area in a direction at right angles to the recording track due to the accumulation of heat and can reduce the remaining non-erasure due to rewrite. At the same time, since the unidirectional pulse-like reproduction waveform corresponding to the rise and fall portions of the pulse of the recording signal can be obtained with high fidelity, any differential circuit that has been required conventionally need not be disposed and an information recording apparatus devoid of the drop of an S/N (signal-to-noise ratio) due to the differential circuit can be accomplished. Still further, the present invention is a excellent for providing high density recording.

What is claimed is:

1. A method of recording an information on a rewritable recording medium by radiating a laser beam to the recording medium while changing the level of power of the laser beam, comprising the step of:
   modulating the level of the laser beam power for a predetermined duration among at least high, intermediate, and two levels during recording,
   wherein said modulating comprises the step of:
   starting with the intermediate power level;
   lowering the power level from said intermediate power level by producing a laser beam power waveform having a downward pulse at the low level for a predetermined duration before or after increasing the power level from said intermediate level to the high level by producing said laser beam power waveform having an upward pulse at the high level for a predetermined duration;
   returning the power level to the intermediate power level,
     wherein increment of the power level from said intermediate level to said high level is within the range of from. 0.8 to 1.2 times the decrement of the power level of said downward pulse from said intermediate level to said low level.

2. A method of recording according to claim 1, further comprising the steps of holding the power level at said intermediate level for a predetermined duration between said upward pulse and said downward pulse.

3. A method of recording according to claim 2, wherein said predetermined duration of said intermediate level is up to five times the minimum of said predetermined duration of said downward pulse and upward pulse.

4. A method of recording an information on a rewritable recording medium by radiating a laser beam to the recording medium while changing the level of power of the laser beam, comprising the step of:

modulating the level of the laser beam power for a predetermined duration among at least high, intermediate, and low levels during recording, wherein said modulating comprises the step of:

starting with the intermediate power level:

lowering the power level from said intermediate power level by producing a laser beam power waveform having a downward pulse at the low level for a predetermined duration before and after increasing the power level from said intermediate level to the high level by producing said laser beam power waveform having an upward pulse at the high level for a predetermined duration;

returning the power level to the intermediate power level, wherein the increment of the power level from said intermediate level to said high level is within the range of from 0.8 to 1.2 times the decrement of the power level of said downward pulse from said intermediate level to said low level.

5. A method of recording according to claim 4, further comprising the steps of holding the power level at said intermediate level for a predetermined duration between said upward pulse and said downward pulse.

6. A method of recording according to claim 5, wherein said predetermined duration of said intermediate level is up to five times the minimum of said predetermined duration of said downward pulse and upward pulse.

7. In an information recording apparatus for recording on a rewritable recording medium by radiating a laser beam to the recording medium while changing the level of power of the laser beam between high and intermediate power levels, an improved method of recording comprising the step of:

modulating the level of the laser beam power for a predetermined duration among at least high, intermediate, and low levels during recording, wherein said modulating comprises the step of:

starting with the intermediate power level;

lowering the power level from said intermediate power level by producing a laser beam power waveform having a downward pulse at the low level for a predetermined duration before and/or after increasing the power level from said intermediate level to the high level by producing said laser beam power waveform having an upward pulse at the high level for a predetermined duration;

returning the power level to the intermediate power level.

8. A method of recording according to claim 7, wherein increment of the power level from said intermediate level to said high level, expressed by the product of said predetermined duration of said upward pulse and the power difference between said high and intermediate levels, is within the range of from 0.8 to 1.2 times the decrement of the power level from said intermediate level to said low level, expressed by the product of said predetermined duration of said downward pulse and the power difference between said intermediate and low levels.

9. A method of recording to any one of claims 1-8, wherein said recording medium is formed from any one of the group of information recording elements consisting essentially of In-Se, In-Sb, Ge-Sb-Te, and Tb-Fe-Co.

* * * * *